United States Patent [19]

Nakano

[11] Patent Number: 4,509,083
[45] Date of Patent: Apr. 2, 1985

[54] HEAD TRACKING CONTROL FOR VIDEO TAPE RECORDER

[75] Inventor: Kenji Nakano, Ebina, Japan

[73] Assignee: Sony Corporation, Tokyo, Japan

[21] Appl. No.: 373,128

[22] Filed: Apr. 29, 1982

[30] Foreign Application Priority Data

May 6, 1981 [JP] Japan .................................. 56-67885

[51] Int. Cl.$^3$ ......................... G11B 5/58; G11B 21/10
[52] U.S. Cl. .................................... 360/77; 360/19.1
[58] Field of Search ...................... 360/18, 19.1, 20, 77

[56] References Cited

U.S. PATENT DOCUMENTS 4,237,500 12/1980 Sanderson .............................. 360/77

Primary Examiner—George G. Stellar
Attorney, Agent, or Firm—Lewis H. Eslinger; Alvin Sinderbrand

[57] ABSTRACT

Apparatus for reproducing an information signal comprised of a video signal, a PCM audio signal and four pilot signals from a plurality of parallel tracks extending obliquely on a magnetic tape, the video signal and one of the pilot signals being recorded in a field section of each track and the audio signal being recorded in a subsequent overlap section of each track, the four pilot signals being recorded in successive tracks, the apparatus including first and second rotary magnetic heads for scanning the tracks to reproduce the information signal, both heads being in reproducing contact with the tape during reproduction of the audio signal by one of the heads; four band-pass filters for separating the pilot signals, respectively, from the reproduced information signal, a selector circuit for selecting two of the pilot signals reproduced as cross-talk pilot signals from tracks adjacent to the track being scanned; AM detectors for detecting the levels of the cross-talk pilot signals and producing two error detection signals in response thereto; sample and hold circuits for sampling the error detection signals and holding the last sampled values of the two error detection signals during scanning of the field section of each respective track; and comparators for comparing the two last sampled values for each track to produce control signals to control the scanning of the subsequent overlap section of the same track by the same first or second head.

7 Claims, 16 Drawing Figures

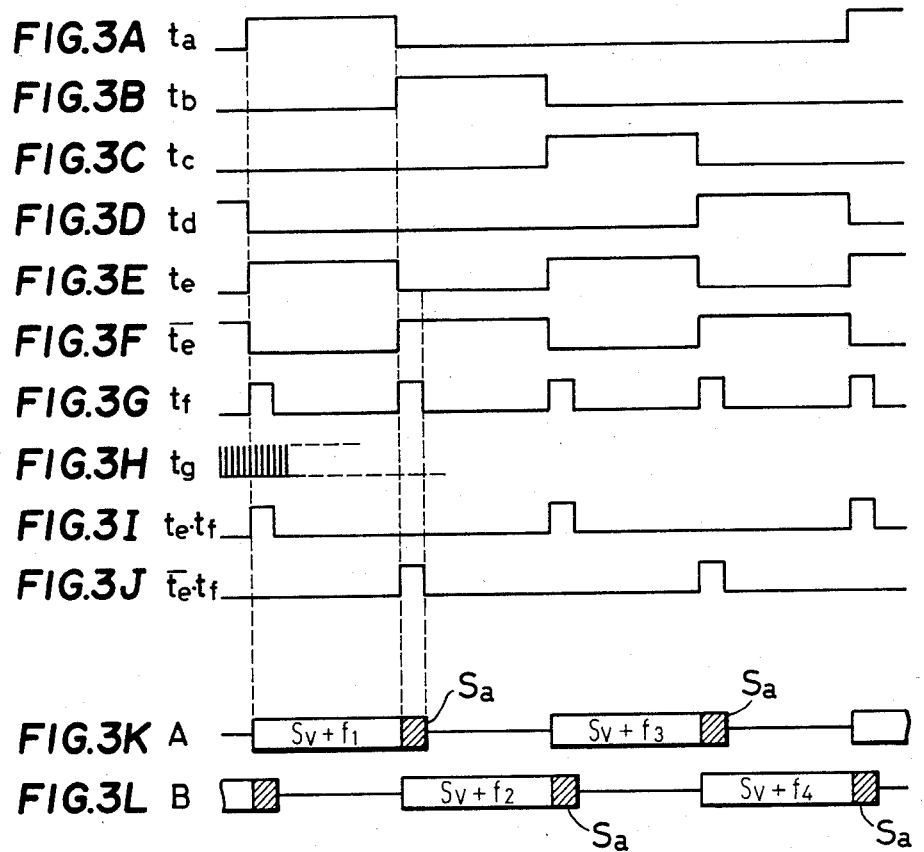

HEAD TRACKING CONTROL FOR VIDEO TAPE RECORDER

BACKGROUND OF THE INVENTION

This invention relates generally to information signal recording and reproducing apparatus and, more particularly, is directed to apparatus for recording and reproducing an information signal comprised of video information, audio information and tracking control information on a magnetic tape with a plurality of rotary magnetic heads.

DESCRIPTION OF THE PRIOR ART

Information signal recording and reproducing apparatus for recording and reproducing a video signal on a magnetic tape by means of a rotary magnetic head assembly are well known in the art. For example, in a helical scan type video tape recorder (VTR), at least one rotary magnetic head is rotated at a predetermined angle with respect to the longitudinal or tape running direction of a magnetic tape as the latter is advanced so as to form successive video tracks extending obliquely on the magnetic tape. With the helical scan type video tape recorder, it is possible to achieve high density recording of the video signal by advancing the magnetic tape at a slow running speed and, at the same time, providing a high relative speed between the magnetic head assembly and magnetic tape. However, with such high density recording, the resultant width of each track recorded on the magnetic tape is narrowed. It therefore becomes more difficult to maintain high tracking accuracy with such narrower tracks. Thus, considering the lack of precision in dimensioning the gaps of the magnetic heads, the lack of precision in dimensioning the head drum about which the magnetic tape is wrapped, the expansion and shrinkage of the magnetic tape, and the like, it is generally considered difficult to maintain high tracking accuracy of the magnetic heads with respect to the tracks recorded on the magnetic tape when the tracks have a width equal or less than 10 $\mu$m. However, in order to achieve high density recording, a track width less than 10 $\mu$m is generally required. Accordingly, a dynamic tracking method has been proposed to accurately control movement of the rotary magnetic heads with respect to the record tracks.

In accordance with the aforementioned dynamic tracking method, pilot signals used for tracking control are frequency-multiplexed with the video signal and the resultant frequency-multiplexed signal is then recorded on the magnetic tape. During the reproduction operation, the frequency-multiplexed signal is reproduced by the rotary magnetic heads and the pilot signals are extracted therefrom in order to obtain tracking information. Control signals corresponding to the tracking information are supplied to piezo-electric elements, such as bi-morph elements, which support the rotary magnetic heads to control the latter to accurately trace the record tracks.

With known helical scan type VTRs, an audio signal can also be recorded on the magnetic tape, along with the video signal. In particular, in one known helical scan type VTR, an audio signal is recorded and reproduced on an audio track extending in the longitudinal or tape running direction of the magnetic tape by a stationary magnetic head, while the rotary magnetic heads are used to record the video signal. However, as aforementioned, to achieve high density recording, the magnetic tape is advanced at a slow tape running speed. Accordingly, since the speed of advancement of the magnetic tape relative to the stationary magnetic head is reduced, there results a consequent deterioration of the signal-to-noise (S/N) ratio of the audio signal. This, of course, results in a deterioration in the quality of the reproduced audio signal.

In order to overcome the aforementioned problem in the recording and reproducing of the audio signal by a stationary magnetic head, and in order to achieve high density recording, it has been proposed to record and reproduce the audio signal by means of a rotary magnetic head, whereby the speed of advancement of the magnetic tape relative to the head may be increased over that achieved with a stationary magnetic head. In this manner, high density recording of the audio signal can be achieved without deterioration in the quality of the reproduced audio signal.

In accordance with one method of recording the audio signal with a rotary magnetic head, it has been proposed to frequency-multiplex the audio signal and the video signal and record the frequency-multiplexed signal on the magnetic tape by frequency modulation. With this method, however, the audio signal, or at least a portion thereof, cannot be erased, for example, when it is desired to record over the audio signal. Thus, in accordance with another method that has been proposed, an overscan or overlap section is provided for each oblique track, for example, by increasing the tape winding or wrap angle about the guide drum assembly of the helical scan type VTR. In this manner, each record track obliquely formed on the magnetic tape by the rotary magnetic head assembly includes a video track section and an audio track section, the latter of which corresponds to the aforementioned overscan section. Where the rotary magnetic head assembly includes two rotary magnetic heads, during the overscan section, both magnetic heads are simultaneously in contact with the magnetic tape during an overlap period, one of the heads being used to record the video signal and the other head being used to record the audio signal in the overscan section. In accordance with this overscan or overlap method, the audio signal is time-compressed and recorded separate from the video signal in the overscan section of each track. It is to be appreciated that their method of recording is superior to the aforementioned method of recording in that the audio signal can be easily recorded and reproduced using only one of the two rotary magnetic heads, and editing of the recorded audio signal can be easily accomplished.

With the aforementioned overlap method, it is preferable to convert the analog audio signal into digital form, for example, by pulse code modulating the analog audio signal to form a PCM (Pulse-Code-Modulation) audio signal which is then recorded and reproduced with respect to the magnetic tape. The PCM audio signal may be modulated by any special modulation method, for example, NRZ (Non-Return to Zero), PE (Phase Encoding), MFM (Modified Frequency Modulation), and M$^2$FM (Modified Modified Frequency Modulation). Of these modulation methods, the NRZ method is preferable since it is capable of increasing the minimum magnetization inversion interval in consideration of the resultant high density recording on the magnetic tape. However, when such PCM recording method is used, the frequency range of the audio signal recorded on the magnetic tape is wide, extending from a frequency close to DC frequency to a high frequency determined by the period of the PCM audio signal. Accordingly, the frequency range of the PCM audio signal overlaps the the frequency range of the pilot signals used for tracking control with the dynamic tracking method, as aforementioned. As a result, the pilot signals which are normally superimposed on the video signal, cannot be recorded with the PCM audio signal in the overscan section of the tape, whereby accurate tracking of this latter section is not achieved.

OBJECTS AND SUMMARY OF THE INVENTION

Accordingly, it is an object of this invention to provide an information signal recording and reproducing apparatus that avoids the above-described difficulties encountered with the prior art.

More particularly, it is an object of this invention to provide an information signal recording and reproducing apparatus with which an audio signal is recorded and reproduced by a rotary magnetic head assembly.

It is another object of this invention to provide an information signal recording and reproducing apparatus with which a time-compressed PCM audio signal is recorded in an overscan section of each track on a magnetic tape, and accurate tracking by the rotary magnetic head assembly during the reproduction operation is achieved by reproduction of pilot signals mixed with the video signal in the respective track.

In accordance with an aspect of this invention, apparatus is provided for reproducing an information signal comprised of a first video signal, a second information signal and tracking information signals recorded in parallel tracks on a record medium, the first video signal and the tracking information signals being recorded in a first section of each of the tracks and the second information signal being recorded in a second subsequent section of each of the tracks, the apparatus including transducer means for scanning the tracks to reproduce the information signal; and control means for controlling the scanning of the second subsequent section of each of the tracks by the transducer means in response to the tracking information signals reproduced by the transducer means during scanning of the first section of the respective track.

The above, and other, objects, features, and advantages of the present invention will be apparent from the following detailed description of an illustrative embodiment of the invention which is to be read in connection with the accompanying drawings.

BRIEF DESCRIPTION OF THE DRAWINGS

FIGS. 3A-3L are time charts used for illustrating the operation of the VTR of FIG. 2;

DETAILED DESCRIPTION OF A PREFERRED EMBODIMENT

Figure 1:
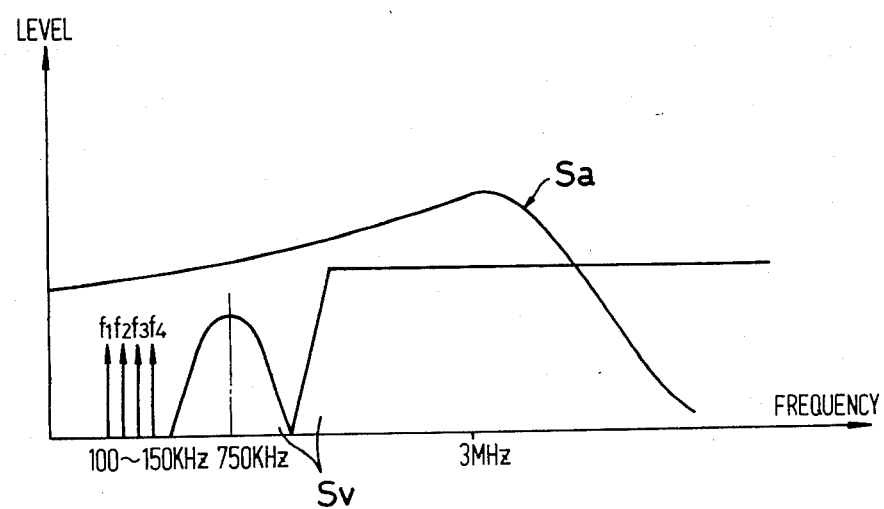
FIG. 1 is a graphical diagram of the frequency spectrum of an information signal recorded by a VTR according to the present invention.

Referring to the drawings in detail, and initially to FIG. 1 thereof, the frequency spectrum of an information signal recorded by a VTR according to the present invention will first be discussed. As shown therein, the video signal to be recorded with the VTR includes a frequency-modulated (FM) luminance or Y-signal in an upper frequency range and a chrominance of C-signal in a lower, non-overlapping frequency range, for example, with a center frequency of 750 KHz. Pilot signals $f_1$-$f_4$ used for tracking control are distributed within a frequency range lower than that used for the chrominance signal, for example, in the frequency range of 100-150 KHz. It is to be appreciated, however, that the PCM audio signal $S_a$ is distributed within a substantially DC frequency range with a 3 MHz center frequency, which frequency range overlaps all of the aformentioned frequency ranges, including that of the pilot signals $f_1$-$f_4$. Accordingly, while the pilot signals $f_1$-$f_4$ can be separated from the video signal, such separation between the pilot signals $f_1$-$f_4$ and the audio signal $S_a$ cannot be achieved because of the overlapping frequency range with respect to the audio signal. In this manner, the pilot signals $f_1$-$f_4$ cannot be mixed with the audio signal $S_a$ to be used for tracking control of an overscan section of each track.

Figure 2:
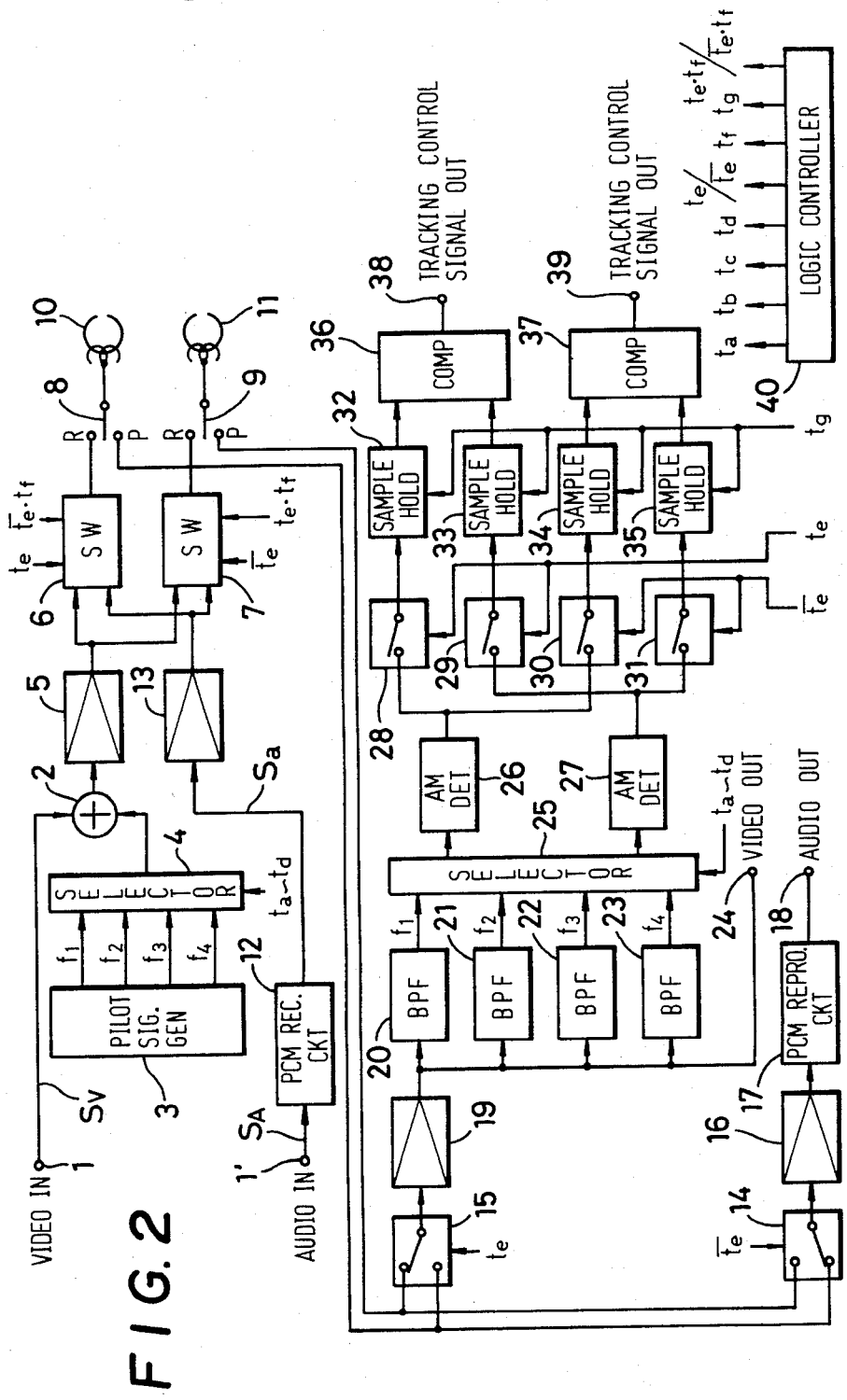
FIG. 2 is a block diagram of a portion of a VTR according to one embodiment of the present invention.

Referring now to FIG. 2, a block diagram of a portion of a VTR according to one embodiment of this invention will now be described. In particular, in the recording section of the VTR, a video signal $S_v$ is supplied to an adder 2 from a video signal input terminal 1. A pilot signal generator 3 generates four pilot signals $f_1$-$f_4$ having different frequencies and supplies these pilot signals to a selector 4 which sequentially selects the pilot signals during successive field intervals and supplies the same to another input of adder 2. The latter circuit adds the pilot signals $f_1$-$f_4$ to the video signal $S_v$ and the combined output signal therefrom is supplied to head change-over switch circuits 6 and 7 through an amplifier 5. The latter circuits supply the combined output signal to rotary magnetic heads 10 and 11, respectively, through recording/reproducing change-over switches 8 and 9 when the latter are switched in the recording mode, that is, when the movable arms thereof are in contact with fixed recording mode terminals R.

An analog audio signal $S_A$ is supplied to a PCM recording circuit 12 from an audio signal input terminal 1' where it is converted from analog form into a PCM (Pulse-Code-Modulation) audio signal $S_a$. PCM audio signal $S_a$ is time-compressed and frequency modulated by PCM recording circuit 12 prior to recording the signal on a magnetic tape M. PCM audio signal $S_a$ is then supplied to head change-over switch circuits 6 and 7 through an amplifier 13, and from the switch circuits, to rotary magnetic heads 10 and 11 through recording/reproducing change-over switches 8 and 9 when the latter are switched to their recording mode terminals R.

Figure 4A:
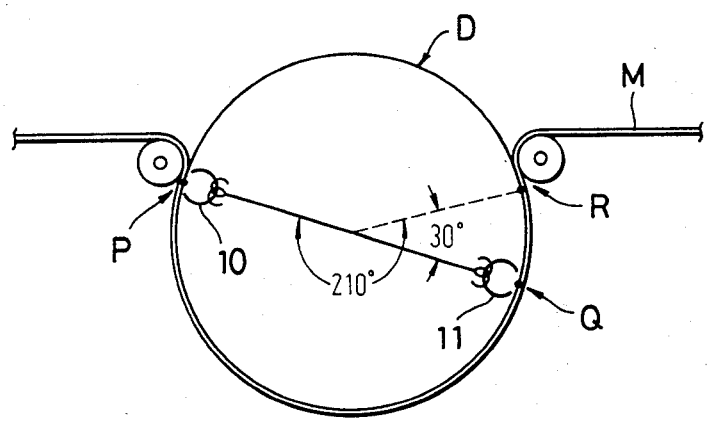
FIG. 4A is a schematic plan view of a rotary magnetic head assembly for use with a VTR according to one embodiment of this invention.
Figure 4B:
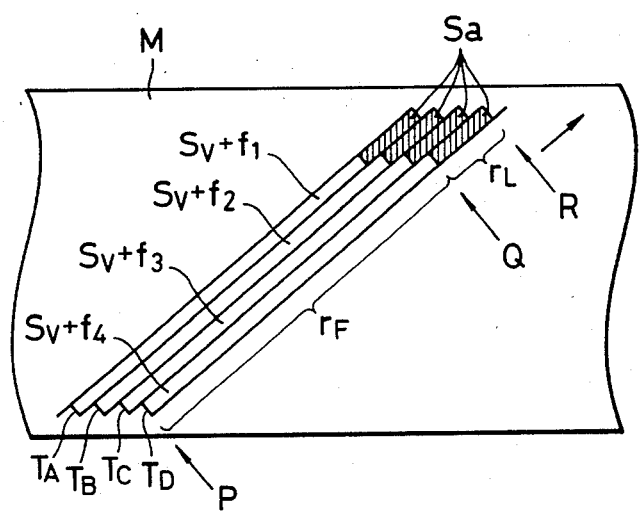
FIG. 4B is a schematic plan view of a section of magnetic tape showing the arrangement of the tracks recorded thereon with the VTR according to the present invention.

In accordance with this invention, rotary magnetic heads 10 and 11 record the video signal, pilot signals, and audio signal in record tracks $T_A$, $T_B$, $T_C$, and $T_D$ extending obliquely on a magnetic tape M without guard bands between adjacent tracks, that is, with the longitudinal edges of adjacent tracks being recorded in an abutting relation, as shown in FIG. 4B. In particular, each track is divided into two sections, that is, a first field section $r_F$ in which the video signal $S_v$ and one of the pilot signals $f_1$–$f_4$ are recorded and an overlap or overscan section $r_L$ in which only the PCM audio signal $S_a$ is recorded, the length of overlap section $r_L$ being about 1/6 that of field section $r_F$ for each track.

Referring now to FIG. 4A, a rotary magnetic head assembly for recording the video signal, pilot signals, and audio signal in the format shown in FIG. 4B according to this invention includes the aforementioned two rotary magnetic heads 10 and 11 which are arranged to subtend an angle of 180°, that is, the two rotary magnetic heads are arranged in opposing relation to each other. The rotary magnetic head assembly includes a rotary guide drum D which is rotated at a constant speed, and a magnetic tape M is helically wound about the other periphery of rotary guide drum D so as to subtend an angle of approximately 220°. Magnetic tape M is advanced at a constant speed by a tape drive system (not shown) comprised of a capstan and a pinch roller and is guided about the guide drum by guide rollers or pins. During the recording operation, rotary magnetic heads 10 and 11 alternately trace the record tracks shown in FIG. 4B. It is to be appreciated that rotary magnetic heads 10 and 11 are simultaneously in contact with magnetic tape M during an overlap or overscan period $T_L$. In particular, during approximately 180° rotation of each head, one head records the video signal $S_v$ and one of the pilot signals $f_1$–$f_4$ in the field section $r_F$ of a track during a field period $T_F$. During the succeeding 30° rotation of the respective head, the audio signal $S_a$ is recorded in the overlap section $r_L$ during the overlap period $T_L$. During this latter 30° rotation, however, both heads are in contact with tape M, that is, during such time, the other head begins recording the video signal and the next pilot signal in the next adjacent track. It is to be appreciated that, since the heads are in contact with tape M for approximately 220°, each head is in contact with the tape for an additional 5° prior to recording a track and an additional 5° after recording a track. For ease of description, point P in FIGS. 4A and 4B corresponds to the point where each magnetic head begins tracing a track, point Q corresponds to the end of the recording of the video signal in field section $r_F$ of each track and also the beginning of recording of the audio signal $S_a$ in the overlap section $r_L$ of each track, and point R corresponds to the end of recording of each track.

Referring back to FIG. 2, the reproducing section of the VTR according to this invention will now be discussed. In particular, the video signal $S_v$, the pilot signals $f_1$–$f_4$, and the PCM audio signal $S_a$ are reproduced from the record tracks by rotary magnetic heads 10 and 11 and supplied to head change-over switch circuits 14 and 15 through switches 8 and 9 which have their movable arms in contact with fixed reproducing mode terminals P thereof. In particular, the signals reproduced by rotary magnetic head 10 are supplied to one fixed terminal of head change-over switch circuit 14 and one fixed terminal of head change-over switch circuit 15, and the signals reproduced by rotary magnetic head 11 are supplied to another fixed terminal of each of head changeover switch circuits 14 and 15. Head changeover switch circuit 14 is controlled to supply only the PCM audio signal $S_a$ through an amplifier 16 to a PCM reproducing circuit 17 which demodulates the PCM audio signal $S_a$ and converts the demodulated signal into an analog audio signal which is supplied to an audio output terminal 18.

The video signal $S_v$ and pilot signals $f_1$–$f_4$ are obtained from head change-over switch circuit 15 and supplied through an amplifier 19 to a video output terminal 24. The output signals from amplifier 19 are also supplied to band-pass filters 20, 21, 22, and 23 which have band-pass characteristics to produce the pilot signals $f_1$, $f_2$, $f_3$, and $f_4$ therefrom, respectively, which pilot signals are supplied to a selector circuit 25. The latter circuit selects two of the four pilot signals and supplies the selected signals to amplitude detectors 26 and 27, respectively. The output signal from amplitude detector 26 is then supplied to sample and hold circuits 32 and 34 through switches 28 and 30, respectively. In like manner, the output signal from amplitude detector 27 is supplied to sample and hold circuits 33 and 35 through switches 29 and 31, respectively. The output signals from sample and hold circuits 32 and 33 are then supplied to a comparator 36, and the output signals from sample and hold circuits 34 and 35 are supplied to a comparator 37. Comparators 36 and 37, in turn, produce tracking control signals at output terminals 38 and 39, respectively, which output signals are supplied to means for controlling the positions of rotary magnetic heads 10 and 11 in the widthwise direction of the record tracks during the reproducing operation. For example, the means for controlling the positions of the heads may include bimorph elements on which rotary magnetic heads 10 and 11 are mounted. As will now be described in detail, a timing signal generator or logic controller 40 common to both the recording and reproducing sections of the VTR of FIG. 2 generates timing signals $t_a$–$t_g$, as shown in FIGS. 3A–3J.

In operation, in the recording mode of operation, the movable arms of switches 8 and 9 are moved into contact with fixed recording mode terminals R. Timing signals $t_a$, $t_b$, $t_c$, and $t_d$ (FIGS. 3A–3D) from timing signal generator 40 are supplied to selector circuit 4 for selecting the respective pilot signals $f_1$–$f_4$ from pilot signal generator 3 to be supplied to adder 2. In particular, each timing signal $t_a$–$t_d$ is a pulse signal having a period corresponding to one field period $T_F$, with timing signals $t_a$–$t_d$ being sequentially produced during successive field periods such that each cycle of the four timing signals $t_a$–$t_d$ comprises four field periods $4T_F$. In this manner, pilot signal $f_1$ is selected during a first field period by timing signal $t_a$, pilot signal $f_2$ is selected during the next field period by timing signal $t_b$, pilot signal $f_3$ is selected during the next field period by timing signal $t_c$, and pilot signal $f_4$ is selected during the last field period of the cycle by timing signal $t_d$. As a result, the respective pilot signals are sequentially and repeatedly selected during successive field periods. The respective pilot signal $f_1$, $f_2$, $f_3$ or $f_4$ in each field period is added to each field of the video signal $S_v$ in adder 2 and supplied to switch circuits 6 and 7.

These latter circuits, in response to timing signal $t_e$ (FIG. 3E) and inverted timing signal $\overline{t_e}$ (FIG. 3F) alternately supply one field period of the video signal $S_v$ and the respective pilot signal $f_1$, $f_2$, $f_3$ or $f_4$ to rotary magnetic heads 10 and 11 for recording in record tracks $T_A$, $T_B$, $T_C T_D$ on magnetic tape M, as shown in FIG. 4B. In particular, as shown in FIG. 4B, the video signal $S_v$ and the first pilot signal $f_1$ are recorded in a first record track $T_A$ by, for example, rotary magnetic head 10. In the next field interval, the video signal $S_v$ and pilot signal $f_2$ are recorded by rotary magnetic head 11 in the next adjacent track $T_B$. In the next field interval, the video signal $S_v$ and pilot signal $f_3$ are recorded in track $T_C$ by rotary magnetic head 10 and, in the last field interval of the cycle, the video signal $S_v$ and pilot signal $f_4$ are recorded in track $T_D$ by rotary magnetic head 11. In addition, a timing signal $t_f$, as shown in FIG. 3G, is combined with timing signal $t_e$, for example, by an AND circuit (not shown) and supplied to switch circuit 7, and is also combined with inverted timing signal $\overline{t_e}$ and supplied to switch circuit 6, the resultant signals being shown in FIGS. 3I and 3J, respectively. It is to be appreciated that the resultant signal $\overline{t_e} \cdot t_f$ is produced after the trailing edge of timing signal $t_e$ also supplied to switch circuit 6. In this regard, after the trailing edge of timing signal $t_e$, which results in the video signal $S_v$ and the pilot signal $f_1$ or $f_3$ being recorded in a record track by rotary magnetic head 10 during alternate field intervals, the resultant signal $\overline{t_e} \cdot t_f$ having a period equal to the overlap period $T_L$ causes switch circuit 6 to supply the PCM audio signal $S_a$ to rotary magnetic head 10 for recording in the overlap or overscan section $r_L$ of the respective track, as shown in FIGS. 3K and 4B. In like manner, after switch circuit 7 supplies the video signal $S_v$ and the pilot signal $f_2$ or $f_4$ to rotary magnetic head 11 during the remaining field intervals, the resultant signal $t_e \cdot t_f$ is supplied to switch circuit 7 to cause the latter to supply the PCM audio signal $S_a$ to rotary magnetic head 11 to be recorded in the overlap section of the respective track, as shown in FIGS. 3L and 4B. In other words, head change-over switch circuit 6 supplies the video signal $S_v$ and the pilot signal $f_1$ or $f_3$ during alternate odd field periods $T_F$ to rotary magnetic head 10, followed by the PCM audio signal $S_a$ in the same track but during the beginning of the next even field interval. In like manner, switch circuit 7 supplies the video signal $S_v$ and the pilot signal $f_2$ or $f_4$ during alternative even field periods $T_F$ to rotary magnetic head 11 followed by the PCM audio signal $S_a$ to be recorded by rotary magnetic head 11 in the overlap period $T_L$ for the same track during the beginning of the next odd field interval. In this manner, oblique record tracks, each consisting of a field section $r_F$ and an overlap section $r_L$ are sequentially formed on magnetic tape M by rotary magnetic heads 10 and 11, as shown in FIG. 4B. It is to be appreciated that the pilot signals $f_1$–$f_4$ are only recorded in the field section $r_F$ with the video signal $S_v$ for each track and are not recorded with the PCM signal $S_a$ in the overlap section $r_L$ of each track.

During the reproducing operation, the movable arms of change-over switches 8 and 9 are in contact with reproducing mode terminals P. Rotary magnetic head 10 alternately reproduces the signals in tracks $T_A$ and $T_C$, while rotary magnetic head 11 alternately reproduces the signals recorded in tracks $T_B$ and $T_D$. The resultant signals from heads 10 and 11 are supplied to head change-over switch circuits 14 and 15, the movable arms of which are controlled by inverted timing signals $\overline{t_e}$ and timing signal $t_e$, respectively. In particular, during the odd field intervals $T_F$, timing signal $t_e$ controls the movable arm of switch circuit 15 to contact the fixed terminal thereof supplied with the reproduced signal from rotary magnetic head 10, and controls the movable arm to contact the other fixed terminal supplied with the reproduced signal from rotary magnetic head 11 during even field intervals $T_F$. In this manner, switch circuit 15 only supplies the video signal $S_v$ and the respective pilot signal $f_1$, $f_2$, $f_3$ or $f_4$ in successive field intervals through amplifier 19 to video output terminal 24. On the other hand, inverted timing signal $\overline{t_e}$ controls the movable arm of switch circuit 14 to supply the reproduced signal from rotary magnetic head 10 during even field intervals and the reproduced signal from rotary magnetic head 11 during odd field intervals. In this manner, only the PCM audio signal $S_a$ is supplied through amplifier 16 to PCM reproducing circuit 17.

The video signal $S_v$ and pilot signals $f_1$–$f_4$ are supplied to band-pass filters 20, 21, 22, and 23 which have band-pass characteristics so as to produce only the pilot signals $f_1$–$f_4$ therefrom, respectively, which are supplied to selector circuit 25. Timing signals $t_a$–$t_d$ are also supplied to selector circuit 25. The pilot signals produced by selector circuit 25 correspond to cross-talk components of the pilot signals during reproduction by rotary magnetic heads 10 and 11. In this manner, pilot signals $f_1$ and $f_3$ are selected during each even field interval and pilot signals $f_2$ and $f_4$ are selected during each odd field interval. The respective pilot signals which are selected during each field interval are supplied to amplitude detectors 26 and 27, respectively, which produce amplitude detected or error detection output signals corresponding to the tracking error of the respective head in response thereto. These latter outputs are supplied to sample and hold circuits 32 and 34 and sample and hold circuits 33 and 35, respectively, through switches 28 and 30 and switches 29 and 31, respectively. In other words, during even field intervals, cross-talk pilot signals $f_1$ and $f_3$ are supplied to amplitude detectors 26 and 27 which, in turn, supply amplitude detected output signals to sample and hold circuits 34 and 35. On the other hand, during odd field intervals, cross-talk pilot signals $f_2$ and $f_4$ are supplied to amplitude detectors 26 and 27 which, in turn, supply amplitude detected output signals to sample and hold circuits 32 and 33. In this regard, timing signal $t_e$ is supplied to switches 28 and 29 and inverted timing signal $\overline{t_e}$ is supplied to switches 30 and 31. In this manner, during odd field intervals when selector circuit 25 supplies cross-talk pilot signals $f_2$ and $f_4$ to amplitude detectors 26 and 27, respectively, switches 28 and 29 are closed so that switch 28 supplies the output signal from amplitude detector 26 to sample and hold circuit 32, while switch 29 supplies the output signal from amplitude detector 27 to sample and hold circuit 33. At this time, switches 30 and 31 are controlled by the inverted timing signal $\overline{t_e}$ to be open. In like manner, during even field intervals, cross-talk pilot signals $f_1$ and $f_3$ are supplied by selector circuit 25 to amplitude detectors 26 and 27, respectively. During even field intervals, inverted timing signal $\overline{t_e}$ closes switches 30 and 31 so that the latter supply the output signals from amplitude detectors 26 and 27, respectively, to sample and hold circuits 34 and 35, respectively. At such time, switches 28 and 29 are controlled to be open.

The signals supplied to sample and hold circuits 32–35 during the respective field intervals are sampled by a sampling signal $t_g$, shown in FIG. 3H. DC level output signals from sample and hold circuits 32 and 33 supplied to comparator 36 which produces a tracking control signal at its output terminal 38. In like manner, DC level output signals from sample and hold circuits 34 and 35 are supplied to comparator 37 which produces a tracking control signal at its output terminal 39. In accordance with the tracking control signals obtained at output terminals 38 and 39, tracking control of rotary magnetic heads 10 and 11 is performed so that the output signals from amplitude detectors 26 and 27 become equal to each other. It is to be appreciated that the tracking control signal at output terminal 38 is used to control the tracking operation of rotary magnetic head 10, while the tracking control signal at output terminal 39 is used to control the tracking operation of rotary magnetic head 11.

It is to be appreciated that switches 28-31 are inactive or turned OFF during the overlap period $T_L$ for the respective tracks in which rotary magnetic heads 10 and 11 reproduce the PCM audio signal $S_a$ from the overlap section $r_L$ of each track. In other words, when rotary magnetic head 10 is reproducing the audio signal $S_a$ in the overlap section $r_L$ of a record track during an even field interval, sample and hold circuits 32 and 33 hold the last sampled value corresponding to the cross-talk pilot signals reproduced in the field section $r_F$ of that same track. A similar operation is performed with sample and hold circuits 34 and 35 and rotary magnetic head 11 during odd field intervals. Thus, in accordance with the present invention, when rotary magnetic heads 10 and 11 are reproducing the PCM audio signal $S_a$ in the overlap section $r_L$ of a track, pilot signals are not reproduced since they are not recorded in the overlap section $r_L$. However, during such time, the tracking control information held by sample and hold circuits 32-35 immediately before the respective rotary magnetic head 10 or 11 begins reproducing the overlap section $r_L$, is used for tracking control of the respective heads. In this manner, substantially correct tracking is achieved. It is to be appreciated that, since the length of the overlap section $r_L$ is about 1/6 the length of the field section $r_F$ of a track, the tracking error, if any, during scanning of the overlap section $r_L$ with the above method, is negligible. In this manner, accurate tracking control of the entire track including the field section $r_F$ and the overlap section $r_L$ can be performed.

It is to be appreciated that, with the present invention, in which tracking control of the overlap section $r_L$ is achieved by the last sampled cross-talk pilot signals reproduced in the corresponding field section $r_F$, accurate tracking of the entire track can be achieved. Therefore, the width of the record tracks can be made narrower and the speed of advancement of the magnetic tape can be made slower to achieve high density recording without substantial deterioration of the reproduced signal.

It is to be appreciated that, although a specific embodiment has been shown with respect to the present invention, modifications and changes to the invention within the scope of the claims can be made. For example, although the present invention utilizes four pilot signals, the number of pilot signals is not so limited. In addition, although the present invention has been described with regard to the recording of a PCM audio signal in the overlap section of each track, other signals may be recorded in the overlap section, for example, address signals, data communication signals, still picture signals, and the like, which may be converted to a PCM signal and then recorded. In addition, although switches 8, 9, 14 and 15 have been shown as single-pole, double-throw switches and switches 28-31 have been shown as single-pole, single-throw switches for ease of illustration, the switches are preferably semiconductor devices.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Apparatus for reproducing an information signal comprised of a first video signal, a second information signal and tracking information signals recorded in parallel tracks on a record medium, said first video signal and said tracking information signals being recorded only in a first section of each of said tracks and said second information signal being recorded with no tracking information signals in a second subsequent section of each of said tracks, said first video signal being recorded in said tracks in a first frequency range, said tracking information signals being recorded in said tracks in a second frequency range lower than and not overlapping said first frequency range, and said second information signal being modulated and recorded in said tracks in a third frequency range which overlaps at least said second frequency range of said tracking information signals, said apparatus comprising:

transducer means for scanning said tracks to reproduce sequentially said first video signal including said tracking information signals and said second information signals;

means for separating said tracking information signals from said reproduced first video signal and producing error detection signals corresponding to scanning errors of said transducer means in response to said separated tracking information signals; and means for holding an error detecting signal produced during scanning of the first section of each of said tracks and producing second-section tracking control signals, whereby the scanning of said second subsequent section of each of said tracks by said transducer means is controlled in response to said second-section tracking control signals derived from the tracking information signals included only with the first video signal and reproduced by said transducer means during scanning of the first section of the respective track.

2. Apparatus according to claim 1; in which said transducer means includes first and second transducer elements, and both of said first and second transducer elements are in reproducing contact with said record medium during reproduction of said second information signal from the second subsequent section of each of said tracks.

3. Apparatus according to claim 1; in which said second information signal is a pulse-code modulated audio signal.

4. Apparatus according to claim 1; in which said means for separating said tracking information signals include filter means for separating said tracking information signals from said reproduced information signal, selector means for selecting a portion of said separated tracking information signals corresponding to cross-talk tracking information, and detector means for detecting the level of said selected portion of said separated tracking information signals and for producing said error detection signals in response thereto; said means for holding includes sample and hold means for sampling said error detection signals during scanning of the first section of each track by said transducer means and holding the value of the error detection signal last sampled during scanning of the first section of each track by said transducer means, and signal generator means for producing tracking control signals to control the scanning of the second subsequent section of each of said tracks by said transducer means in response to the value of th error detection signal last sampled during scanning of the first section of the respective track by said transducer means.

5. Apparatus according to claim 4; in which said information signal includes first, second, third and fourth tracking information signals; said filter means includes first, second, third and fourth filter circuits having band-pass characteristics to separate said first, second, third and fourth tracking information signals, respectively, from said reproduced information signal; said selector means selects two of said separated tracking information signals; and said detector means produces first and second error detection signals in response to the two selected tracking information signals, respectively.

6. Apparatus according to claim 5; in which said transducer means includes first and second transducer elements for alternately scanning said tracks to reproduce said information signal; said first, second, third and fourth tracking information signals are recorded in the first sections of successive first, second, third and fourth tracks, respectively; said selector means selects said first and third tracking information signals when said second transducer element scans one of said second and fourth tracks, and selects said second and fourth tracking information signals when said first transducer element scans one of said first and third tracks; said sample and hold means includes first, second, third and fourth sample and hold circuits, said first and second sample and hold circuits sampling said first and second error detection signals during scanning of the first section of each respective track by said first transducer element and holding the value of the first and second error detection signals, respectively, last sampled during scanning of the first section of each respective track by the first transducer element, and said third and fourth sample and hold circuits sampling said first and second error detection signals during scanning of the first section of each respective track by said second transducer element and holding the value of the first and second error detection signals, respectively, last sampled during scanning of the first section of each respective track by said second transducer element; and said means for producing said tracking control signals includes first comparator means for comparing the held values of the first and second error detection signals from the first and second sample and hold circuits to control the scanning of the second subsequent section of each respective track by said first transducer element, and second comparator means for comparing the held values of the first and second error detection signals from the third and fourth sample and hold circuits to control the scanning of the second subsequent section of each respective track by said second transducer element.

7. Apparatus according to claim 6; in which the frequencies of said tracking information signals recorded in adjacent tracks is different.

* * * * *